United States Patent [19]
Kato et al.

[11] Patent Number: 6,040,865
[45] Date of Patent: Mar. 21, 2000

[54] IMAGE SIGNAL CODING METHOD AND APPARATUS, IMAGE SIGNAL TRANSMISSION METHOD, AND SIGNAL RECORDING MEDIUM

[75] Inventors: Motoki Kato; Nobuhiro Igi; Kazunori Yasuda, all of Kanagawa, Japan

[73] Assignee: Sony Corporation, Tokyo, Japan

[21] Appl. No.: 08/991,517

[22] Filed: Dec. 16, 1997

[30] Foreign Application Priority Data

Dec. 18, 1996 [JP] Japan ..................................... 8-338236

[51] Int. Cl.[7] ...................................................... H04N 7/32
[52] U.S. Cl. ........................ 348/416; 348/407; 348/699; 382/236
[58] Field of Search ..................................... 348/400–402, 348/407, 409–416, 699; 386/111; 382/236, 238, 253; 375/240

[56] References Cited

U.S. PATENT DOCUMENTS

| | | | |
|---|---|---|---|
| 5,029,000 | 7/1991 | Colombo ................................. | 348/396 |
| 5,068,724 | 11/1991 | Krause et al. ........................... | 348/402 |
| 5,506,622 | 4/1996 | Kim ....................................... | 348/402 |
| 5,799,110 | 8/1998 | Israelsen et al. ....................... | 382/253 |
| 5,844,612 | 12/1998 | Israelsen ................................. | 348/414 |

FOREIGN PATENT DOCUMENTS 10178645A 6/1998 Japan ............................... H04N 7/32

*Primary Examiner*—Vu Le
*Attorney, Agent, or Firm*—Frommer Lawrence & Haug, LLP.; William S. Frommer

[57] ABSTRACT

The present invention relates to an image signal coding apparatus and method, an image signal transmission method and a recording medium in which an input image signal is divided into a plurality of blocks and a reference image signal is used for carrying out a motion compensative prediction coding to each of the blocks. The present invention is characterized in that a reference image signal is used for each of the blocks to calculate: a motion vector prediction residue of a block for which a motion compensation is carried out; a residue of a block for which no motion compensation is carried out; and an average luminance value of pixel data within a block and a flatness value of the block. For each of the blocks, a magnitude of the aforementioned block motion vector prediction residue is compared to a magnitude of said block residue so that a result of this comparison is used to decide whether to carry out a motion compensation coding. In this process, the average luminance value and the flatness value of the block are used to switch between decision making region division types. According to a result of this decision, a motion compensative prediction coding is carried out for each of the blocks. Thus, even when a prediction residue is small on a flat portion of a image, it is possible to prevent generation of a fixed noise and improve the coding efficiency without deteriorating the image quality.

15 Claims, 14 Drawing Sheets

FIG.4B  MACRO-BLOCK

FIG.4A  FRAME

FIG.4C  SLICE

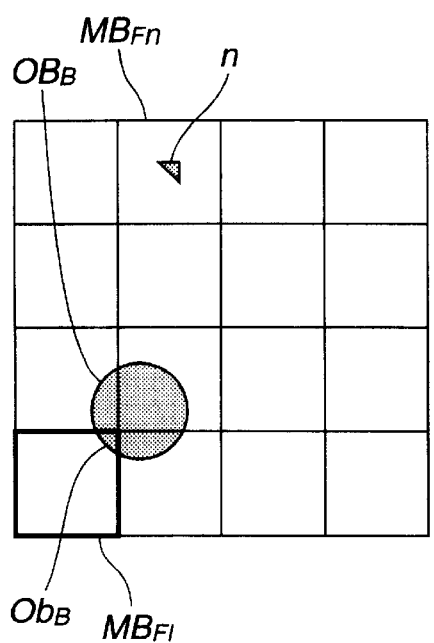
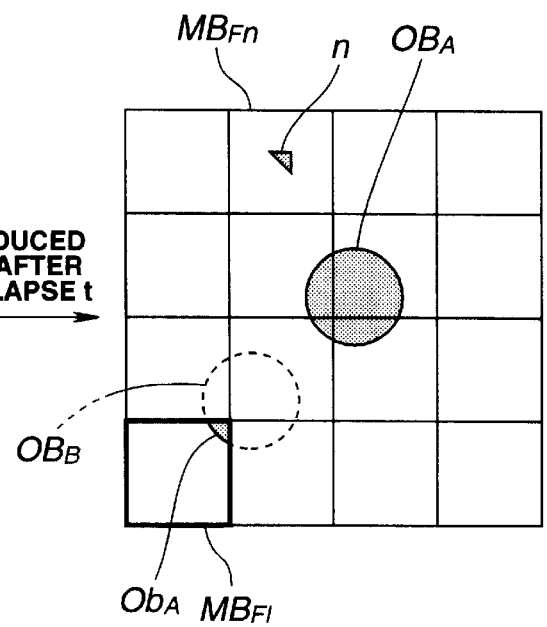
FIG.9A          FIG.9B

IMAGE SIGNAL CODING METHOD AND APPARATUS, IMAGE SIGNAL TRANSMISSION METHOD, AND SIGNAL RECORDING MEDIUM

BACKGROUND OF THE INVENTION

1. Field of the Invention

The present invention relates to a dynamic image signal coding method and apparatus, a dynamic image signal transmission method, and a signal recording medium which can preferably be applied when recording or reproducing a dynamic image signal to/from a recording medium as well as displaying the dynamic image on a display unit, and when transmitting a dynamic image signal from a transmission side through a transmission path to a reception side as in video conference system, a visual telephone system, a television broadcasting system, or the like.

2. Description of the Related Art

Conventionally, when a dynamic image signal is digitized to be recorded or transmitted, the dynamic image signal represents a great amount of data and the data is encoded (compressed). As a representative coding method, there is an coding method of motion compensative prediction type.

FIG. 1 shows a principle of the motion compensative prediction.

The motion compensative prediction is a coding system which utilizes a correlation in the temporal direction of an image signal. That is, a motion vector MV of a current image IO to be encoded is predicted from a motion prediction reference image IR which has been decoded. The image signal which is being decoded to be reproduced is moved in accordance with the signal (according to the motion vector MV), this motion information (motion vector MV) and a prediction residue at that time are transmitted, so as to compress a data amount required for coding.

The representative method of this motion compensative prediction is the so-called MPEG (moving picture expert group). This term represents a dynamic image coding method discussed and concluded by the working group WG11 of a sub committee SC29 of the Joint Technical Committee JTC1 of the ISO (International Standard Organization) and IEC (International Electric Conference).

According to the MPEG, an image (frame or field) is divided into macro blocks, each consisting of 16 lines ×16 pixels, and the compensative prediction is carried out on this macro block basis. The motion compensative prediction can roughly be divided into an intra-coding method and a non-intra coding (inter-coding) method. The intra-coding method utilizes a data only on the macro block concerned, whereas the non-intra coding method utilizes both of a data on the macro block concerned and a data obtained from an image which appears at a different time.

According to the non-intra coding of the motion compensative prediction of the MPEG, it is necessary to detect a motion vector of a macro block of a motion prediction reference image corresponding to the current macro block of the image to be encoded and carry out a DCT (discrete cosine transform) to a difference between the predicted image according to this motion vector and an input image. The DCT coefficient obtained is digitized for carrying out a data compression.

Here, according to the MPEG, when detecting a motion vector of a macro block of a motion prediction reference image corresponding to the macro block of the image currently encoded, a pattern matching is carried out between the motion prediction reference image and the current image to be encoded on the macro block basis. More specifically, as shown in Equation (1) below, a motion vector is detected according to a value Ef which is a sum of absolute values of differences between a luminance signal $S_{i,j}$ of the macro block of the object image to be currently coded and a luminance signal $R_{i+mvx,j+mvy}$ of the motion prediction reference image referenced by an arbitrary motion vector (mvx, mvy).

$$Ef = \Sigma |S_{i,j} - R_{i+mvx,j+mvy}| (i=0 \text{ to } 15, j=0 \text{ to } 15) \tag{1}$$

That is, the motion vector to be obtained is the (mvx, mvy) which makes the aforementioned Ef a minimum value.

Here, for example, if the image entered is affected by a noise or the like, the aforementioned motion vector detection may cause an erroneous detection of a motion vector where the image is flat, for example, or the detected motion vector may not be (0, 0) even when the image is actually still.

That is, when one or both of the aforementioned luminance signal $S_{i,j}$ and the luminance signal $R_{i+mvx,j+mvy}$ which is to minimize the value of the Ef in the Equation (1) above is affected by a noise or the like, the value of the aforementioned Ef cannot become minimum. As a result, it is impossible to obtain a correct motion vector.

Especially when the image is still, and if the macro block which is expected to have a motion vector (0, 0) is affected by a noise or the like, as shown in FIG. 2, the motion vector does not become (0, 0) in spite of no motion present in the macro block. This significantly deteriorates the quality of the image. It should be noted that in the example of FIG. 2, among N frames $F_0$ to $F_{N-1}$, $F_i$ is the reference prediction image IR and the frame $F_{i+j}$ is the object image IO to be currently coded. Here, if the image is still, as the prediction reference image IR corresponding to the macro block MBo in the object image IO to be currently coded, a macro block $MB_{RR}$ of motion (0, 0) is to be detected so as to define the motion vector $MV_R$ as (0, 0). However, if a noise or the like is present, an error is caused in the pattern matching and an incorrect macro block $MV_{RE}$ is detected. In this case, a motion vector $MV_E$ of (mvx, mvy) different from the actual one is obtained. Thus, when the image is still, if a noise or the like is present, a motion vector $MV_E$ of (mvx, mvy) is obtained in stead of a motion vector $MV_R$ of (0, 0), deteriorating the image quality.

In order to solve this problem, when executing a motion compensation (hereinafter, referred to as MC) predicting a motion vector of a macro block, a predetermined decision is made using a luminance value of each macro block and according to the result of this decision, the motion vector is forcibly made to (0, 0). Hereinafter, this processing which forcibly makes the motion vector (0, 0) will be referred to as NonMC. Moreover, the aforementioned predetermined decision will be referred to as an MF/NonMC decision.

A so-called SM3 (Simulation Model 3) of the MPEG uses such a predetermined decision (MC/NonMC decision).

Description will now be directed to the MC/NonMC decision method and the motion compensation prediction method of the MPEG with reference to the attached drawings.

FIG. 3 shows an example of a moving image (dynamic image) signal coding apparatus which carries out the aforementioned MC/Non MC decision. The moving image signal encoding apparatus 41 shown in FIG. 3 is based on a hybrid coding method employing the motion comensative prediction and the DCT in combination.

In FIG. 3, an input moving image signal S41 inputted from a terminal 42 is transmitted to a scan converter 43. In the scan converter 43, an image signal inputted by raster scan is converted into a signal of a block format. That is, as shown in FIG. 4A, the image inputted by raster scan is a data formatted in a frame of H dots × V lines. The scan converter 43 divides the signal of one frame into N slices, each consisting of 16 lines. Each slice is divided into M macro blocks as shown in FIG. 4B. Each macro block consists of a luminance signals corresponding to 16×16 pixels (dots). The luminance signal is divided into blocks Y [1] to Y [4], each based on 8×8 dots. Moreover, this luminance signal of 16×16 dots is related to a color difference signal Cb [5] of 8×8 dots and a color difference signal Cr [6] of 8×8 dots.

The moving image signal S42 which has been converted by the scan converter 43 into a signal of the aforementioned format is transmitted to a motion vector prediction circuit 44, a NonMEerr calculation circuit 45, and a moving image coding circuit 48.

The motion vector prediction circuit 44 carries out a pattern matching between each of the macro blocks of the frames of the moving image signal S42 and a corresponding reference image of predetermined search range stored in a reference image storage block 46 (i.e., a pattern matching is carried out on a macro block basis between an image to be currently coded and a corresponding reference image). According to the results of this pattern matching, a motion vector MV is detected and simultaneously with this, a prediction residue MEerr is calculated, the result of which is outputted to an MC/NonMC decision circuit 47.

Here, if it is assumed that the macro block of the image to be currently coded has a luminance value Si,j and the motion prediction reference image has a luminance value Ri,j, the aforementioned motion prediction residue MEerr can be obtained from Equation (2) as follows.

$$\text{MEerr} = \Sigma |S_{i,j} - R_{i+mvx, j+mvy}|/256 (i=0 \text{ to } 15, j=0 \text{ to } 15) \quad (2)$$

When the moving image signal coding apparatus 41 has completed motion vector prediction of all the macro blocks contained in one frame, the current moving image signal S42 (i.e., image data of the frame) is stored in the reference image storage block 46, which is then used as a reference image for the next image to be inputted.

On the other hand, the NonMEerr calculation circuit 45 calculates a non-motion compensative residue NonMEerr for each of the macro blocks of the frames of the moving image signal S42 successively inputted. That is, the NonMEerr calculation circuit 45 calculates a difference between each of the macro blocks contained in the object image to be currently encoded and inputted frame after frame, and a macro block of motion vector (0, 0) among the reference images stored in the reference image storage block 46. The difference values obtained are outputted for each of the macro blocks as a non-motion compensative residue NonMEerr. Here, the aforementioned non-motion compensative residue NonMEerr is obtained by Equation (3) as follows.

$$\text{NonMEerr} = \Sigma |S_{i,j} - R_{i,j}|/256 (i=0 \text{ to } 15, j=0 \text{ to } 15) \quad (3)$$

The non-motion compensative residue NonMEerr thus obtained is transmitted to the MC/NonMC decision circuit 47.

The MC/NonMC decision circuit 47 is supplied with the aforementioned motion prediction residue MEerr and the non-motion compensative residue NonMEerr and compares the motion prediction residue MEerr to the non-motion compensative residue NonMeerr by using a region division as shown in FIG. 5 for example, so as to make a MC/NonMC decision. That is, in FIG. 5, the vertical axis represents the residue NonMEerr and the horizontal axis represents the motion prediction residue MEerr. The MC/NonMC decision circuit 47 makes the MC/NonMC decision not according to the comparison regions separated by the straight line of NonMEerr=MEerr indicated by a dotted line in the figure but according the comparison regions separated by the solid line indicated in the figure consisting of a straight line connecting (0, 1) to (0, 5, 1), a straight line connecting 90.5, 1) to (1, 1.5), a straight line connecting (1, 1.5) to (1, 2.5), a straight line connection (1, 2.5) to (1.5, 3), a straight line connecting (1.5, 3) to (2.7, 3), and a straight line of NonMEerr=0.9 MEerr+0.57. When the aforementioned motion prediction residue MEerr value is compared to the non-motion compensative residue NonMEerr value, a decision is made to be MC if the value is in the upper left to the aforementioned solid line and NonMC if the value is in the lower right to the solid line.

When the aforementioned MC/NonMC decision circuit 47 made a decision of MC, the motion vector MV (mvx, mvy) inputted is outputted as it is; and when a decision of NonMC is made, the motion vector MV (mvx, mvy) inputted is converted into (0, 0) for output. The motion vector MV outputted from this MC/NonMC decision circuit 47 is supplied to the moving image coding circuit (hybrid encoder) 48 together with the moving image signal S42 of the frame.

Subsequently, FIG. 6 shows a specific configuration of the moving image coding circuit (hybrid encoder) 48 of Fig. FIG. 3.

In this FIG. 6, an input terminal 61 is supplied with the motion vector MV from the aforementioned MC/NonMC decision circuit 47. On the other hand, an input terminal 50 is supplied with an input moving image signal S60 to this moving image coding circuit 48. It should be noted that the input moving image signal S60 corresponds to the moving image signal S42 supplied from the scan converter 43 in FIG. 3.

Moreover, the moving image coding circuit 48 includes a motion compensation inter/intra frame prediction circuit 57 which has an image memory and outputs a prediction image signal S63 which has been read from this image memory according to the motion vector MV from the input terminal 61.

A calculator 51 carries out an addition by using the input moving image signal S60 (S42) from the input terminal 50 as an addition signal and the prediction image signal S63 from the motion compensation inter/intra frame prediction circuit 57 as a subtraction signal, thus calculating a difference between the input moving image signal S42 and the prediction image signal S63, the result of which calculation is outputted as a prediction residue signal S61. It should be noted that the aforementioned prediction is not carried out when a signal having no correlation with an adjacent frame such as a scene change signal is supplied as an input moving image signal. In this case, the input moving image signal S 60 is taken out of the calculator 51 as it is (outputted as an original signal without executing prediction).

Next, the prediction residue signal S61 (or original signal if no prediction is executed) outputted from the calculator 51 is supplied to a DCT circuit 52. This DCT circuit carries out a two-dimensional DCT to the aforementioned prediction residue signal S61. A DCT coefficient outputted from this DCT circuit 52 is converted into a scalar quantity by a quantization circuit 53. The quantization output signal from this quantization circuit 53 is transmitted to a variable length coding (VLC) circuit 58 and to a inverse quantization circuit 54. The VLC circuit 58 carries out, for example, a Huffman coding to the aforementioned quantization output signal. An output signal from this VLC circuit 58 is supplied to a buffer memory 59. The buffer memory 59 smoothes the bit rate for output from an output terminal 60 to a transmission path. When this buffer memory 59 is almost overflown, this is reported as a quantization control information back to the quantization circuit 53. The quantization circuit 53 increases a quantization step so as to reduce a data amount outputted from the quantization circuit 53, thus preventing overflow of the buffer memory 59. Note that the output terminal 60 in FIG. 6 corresponds to the output terminal 49 in FIG. 3.

On the other hand, the inverse quantization circuit 54 carries out an inverse quantization to the aforementioned quantization output signal in accordance with a quantization step information q_step supplied from the quantization circuit 53. An output signal from this inverse quantization circuit 54 is supplied to an inverse DCT circuit 55, where the signal is subjected to the inverse DCT processing. The prediction residue signal S62 which has been decoded is supplied to a calculator 56.

This calculator 56 is also supplied with a signal identical to the prediction image signal S63 which is supplied to the calculator 51. The calculator 56 adds the prediction image signal S68 to the aforementioned prediction residue signal S63, thus enabling to obtain an image signal which is locally decoded. This image signal is identical to the output image at the reception side.

The SM3 of the MPEG thus makes the MC/NonMC decision for carrying out moving image coding. Here, if the decision is made to be NonMC, there is no need of transmitting a motion vector. As shown in FIG. 5, for those areas where the prediction error signal is near to 0 and the areas where the motion prediction residue MEerr value is almost identical to the non-motion compensative residue NonMEerr or the prediction residue MEerr is small, it is possible to reduce the data amount of the motion vector by selecting NonMC.

Next, when carrying out a motion compensative coding, an image inputted may have no motion in the macro block between the object image to be currently coded and the motion prediction reference image but have a great change in the luminance value. For example, such an image may be a still image which has been subjected to a fade-in or fade-out processing for gradually changing the luminance value. It should be noted that in the explanation below, such an image which has been subjected to a fade-in or fade-out processing will be referred to as a fade image.

When an input image in which the luminance value is changed such as in the fade image is subjected to a motion compensative prediction coding by way of pattern matching, the luminance value is greatly changed between the macro blocks corresponding to the object image to be currently coded and the prediction reference image. Consequently, even if the macro block is to have a motion vector (0, 0), the aforementioned Ef is difficult to become minimum, causing an incorrect detection of a motion vector, which results in a block distortion and a mosquito noise in the reproduced image, thus deteriorating the image quality.

That is, for example, in the SM3 of the MPEG, the sum of the absolute value of the difference in the luminance values alone is used for the motion vector detection and the MC/NonMC decision. Accordingly, even when no motion is present between the macro block of the motion prediction reference image and the macro block of the object image to be currently coded, there is a possibility that the motion vector (0, 0) cannot be correctly detected because of a large change in the luminance value between these macro blocks and a macro block different from the essential motion may be detected as a macro block of the reference image. This lowers the coding efficiency and deteriorates the subjective image quality.

To cope with this, the applicant of the present invention disclosed in Japanese Patent Laid-Open Hei 8-98187 (Apr. 12, 1996) a method of obtaining a prediction residue signal of a macro block in case of NonMC by using, instead of the sum of absolute values of a difference in luminance values, a sum of absolute values of differences in AC (alternative current) components of the luminance value in the macro block, for comparison with the sum of absolute values of the luminance values in case of motion compensation, for carrying out the MC/NonMC decision (hereinafter, this method will be referred to as ACME). Note that corresponding to this Japanese Patent application, there is a U.S. Application Ser. No. 08/507/103 (Filed date: Jul. 25, 1995).

FIG. 7 shows a configuration example of the moving image signal coding apparatus using the aforementioned ACME. This apparatus includes an ECMEerr calculation circuit 25 and an MC/NonMC decision circuit 27. Moreover, this moving image signal coding apparatus includes an input terminal 22, a scan converter 23, a motion vector prediction circuit 24, a reference image storage block 26, a moving image coding circuit 28, and an output terminal 29 which respectively correspond to the input terminal 42, the scan converter 43, the motion vector prediction circuit 44, the reference image storage block 46, the moving image coding circuit 48, and the output terminal 49 of FIG. 3, operating identically and accordingly, their explanations will be omitted. Moreover, the signal S22 in FIG. 7 corresponds to the input moving image signal S60 in the moving image coding circuit 28 (the moving image signal S42 in FIG. 3).

In the ACMEerr calculation circuit of FIG. 7, if ACMEerr is assumed to be a sum of absolute values of the difference between the macro block of the object image to be currently coded and the macro block of the reference image of the motion vector (0, 0), then the ACMEerr can be obtained by Equation (4) as follows.

$$\text{ACMEerr} = \Sigma |S_{i,j} - S_{av}) - (R_{i,j} - R0_{av})| (i=0 \text{ to } 15, j=0 \text{ to } 15) \quad (4)$$

In this Equation (4), $S_{av}$ represents an average value of the luminance values in the macro block of the object image to be currently coded and $R0_{av}$ represents an average value of luminance values of the macro block of motion vector (0, 0) of the prediction reference image, which are respectively obtained by Equations (5) and (6) below.

$$S_{av} = \Sigma |S_{i,j}|/256 (i=0 \text{ to } 15, j=0 \text{ to } 15) \quad (5)$$

$$R0_{av} = \Sigma |R_{i,j}|/256 (i=0 \text{ to } 15, j=0 \text{ to } 15) \quad (6)$$

Moreover, in the MC/NonMC decision circuit 27, a decision is made by using a region division as shown in FIG. 8 for example. That is, in FIG. 8, the vertical axis represents the aforementioned ACMEerr, and the horizontal axis represents the aforementioned motion prediction residue MEerr. In this MC/NonMC decision circuit 27, the MC/NonMC decision is made not according to the comparison regions separated by the straight line of ACMEerr=MEerr indicated by a dotted line in the figure, but according to the comparison regions separated by a solid line in the figure consisting of a straight line connecting (0, y1) to (x1, y1), a straight line connecting (x1, y1) to (x2, y2), and a straight line of ACMEerr=MEerr+(x2 −y2). If the comparison between the MEerr and the ACMEerr results in the upper left of the aforementioned solid line, then the decision is made to be MC, and if in the lower right of the aforementioned solid line, the decision is made to be NonMC. It should be noted that in this FIG. 8, $x1 \geq y1$ and $x2 > y2$. The MC/NonMC decision circuit 27, in this region separation shown in FIG. 8, forcibly makes a decision of NonMC in an area where the ACMEerr and the MEerr are both near to 0 and makes a decision of MC in an area where the MCMEerr and the MEerr has almost identical values or the ACMEerr is greater than the MEerr.

In the moving image coding apparatus 21 shown in FIG. 7, the aforementioned decision is made so that a motion vector of (0, 0) can be correctly obtained even when the luminance greatly changes between the macro blocks corresponding to the object image to be currently coded and the motion prediction reference image and no motion is present such as in a fade image.

It is now assumed that a small residue is obtained for the portion having a flat input image when the MEerr and the NonMEerr are calculated between the object image to be currently coded and the motion prediction reference image by using the aforementioned Equations (2) and (3).

The aforementioned MC/NonMC decision of the SM3 of the MPEG cannot determine whether these residues are caused by a change of a small luminance change between the macro blocks or a noise or because a part of an object in the image is contained in the block. That is, when the macro blocks corresponding to the object image to be currently coded and the prediction reference image are both flat and the motion prediction residue is small, the MC/NonMC decision of SM3 of the MPEG cannot distinguish whether the macro block of the object image to be coded is a macro block containing a part of the image having a motion or a macro block containing a noise having no motion.

This will be detailed with reference to FIG. 9. FIG. 9A shows a part of an image of one frame containing an image of an object $OB_B$ which moves with lapse of time. The frame image shown in this FIG. 9A consists of flat macro blocks having almost no luminance change (i.e., macro blocks having only a slight change of the luminance value) excluding the macro blocks including the aforementioned object $OB_B$, but the macro block MBFn contains a noise n. It is assumed that the macro block $MB_{Fn}$ containing this noise n is also a flat macro block having almost no change in the luminance value.

In a case when the MC/NonMC decision of SM3 of the MPEG is used for coding the frame image shown in this FIG. 9A so that the NonMC is selected in an area having a small residue, it is possible to make (0, 0) the motion vector of the macro block $MB_{Fn}$ having no motion but containing the noise n, but there is a danger that a flat block having only a slight change in the luminance value such as a macro block $MB_{FI}$ containing a part $ob_B$ of the image of the aforementioned object $OB_B$ for example may be decided to be a macro block having no motion (a macro block with a motion vector (0, 0)).

That is, if a macro block having a motion is identified as a block having no motion (with motion vector (0, 0)), as shown in FIG. 9B, the part $ob_B$ of the aforementioned object $OB_B$ remains as a fixed noise $ob_A$ in the reproduction image after a lapse of time t from the frame image of FIG. 9A. Note that FIG. 9B shows the $OB_A$ after the lapse of time t together with a position of the object $OB_B$ indicated by a dotted line which existed prior to the laps of time t.

In order to prevent the part $ob_B$ of the object $OB_B$ from remaining as the fixed noise $ob_A$, one solution is that, for example, the NonMC is made to be easily selected in an area having a small motion prediction residue. However, in the case of the aforementioned conventional MC/NonMC method, it is not yet realized to make the NonMC be easily selected in the aforementioned area having a small prediction residue.

Moreover, in the case of the conventional MC/NonMC method, a motion vector is incorrectly detected, for example, in a macro block such as the aforementioned macro block $MB_{Fn}$ which is affected by the noise n, and which is flat, has no motion, and has a small prediction residue, resulting in deterioration of the coding efficiency.

These problems still remain in the MC/NonMC decision method using the aforementioned ACME disclosed in the aforementioned Japanese Patent Laid-Open Hei 8-98187.

OBJECT AND SUMMARY OF THE INVENTION

It is therefore an object of the present invention to provide a moving image (dynamic image) signal coding method and apparatus, a moving image signal transmission method, and a signal recording medium which are capable of preventing generation of a fixed noise even if a flat portion of an image has a small motion prediction residue, and making a motion vector (0, 0) without deteriorating an image quality so as to enhance a coding efficiency and improve a subjective image quality.

The present invention is characterized in that a reference image signal is used for each of the blocks to calculate: a motion vector prediction residue of a block for which a motion compensation is carried out; a residue of a block for which no motion compensation is carried out; and an average luminance value of pixel data within a block and a flatness value of the block. For each of the blocks, a magnitude of the aforementioned block motion vector prediction residue is compared to a magnitude of said block residue so that a result of this comparison is used to decide whether to carry out a motion compensation coding. According to a result of this decision, a motion compensative prediction coding is carried out for each of the blocks. In this process, the average luminance value and the flatness value of the block are used to switch between decision making region division types. Thus, even when a prediction residue is small on a flat portion of a image, it is possible to prevent generation of a fixed noise and improve the coding efficiency without deteriorating the image quality.

BRIEF DESCRIPTION OF THE DRAWINGS

FIG. 9 explains deterioration of the image quality caused by incorrect detection of NonMC.

DETAILED DESCRIPTION OF PREFERRED EMBODIMENTS

Description will now be directed to preferred embodiments of the present invention with reference to the attached drawings.

According to the studies conducted up to now, it is known that in a macro block corresponding to an object image to be currently coded and a motion compensation prediction reference image, if both have low luminance average values and are flat, there is often the case that no motion is detected and the motion prediction residue is defined to be small. In such a case, for example, use of the aforementioned NonMC may leave a part of the image as a fixed noise, which is difficult to be detected by a human.

Figure 5:
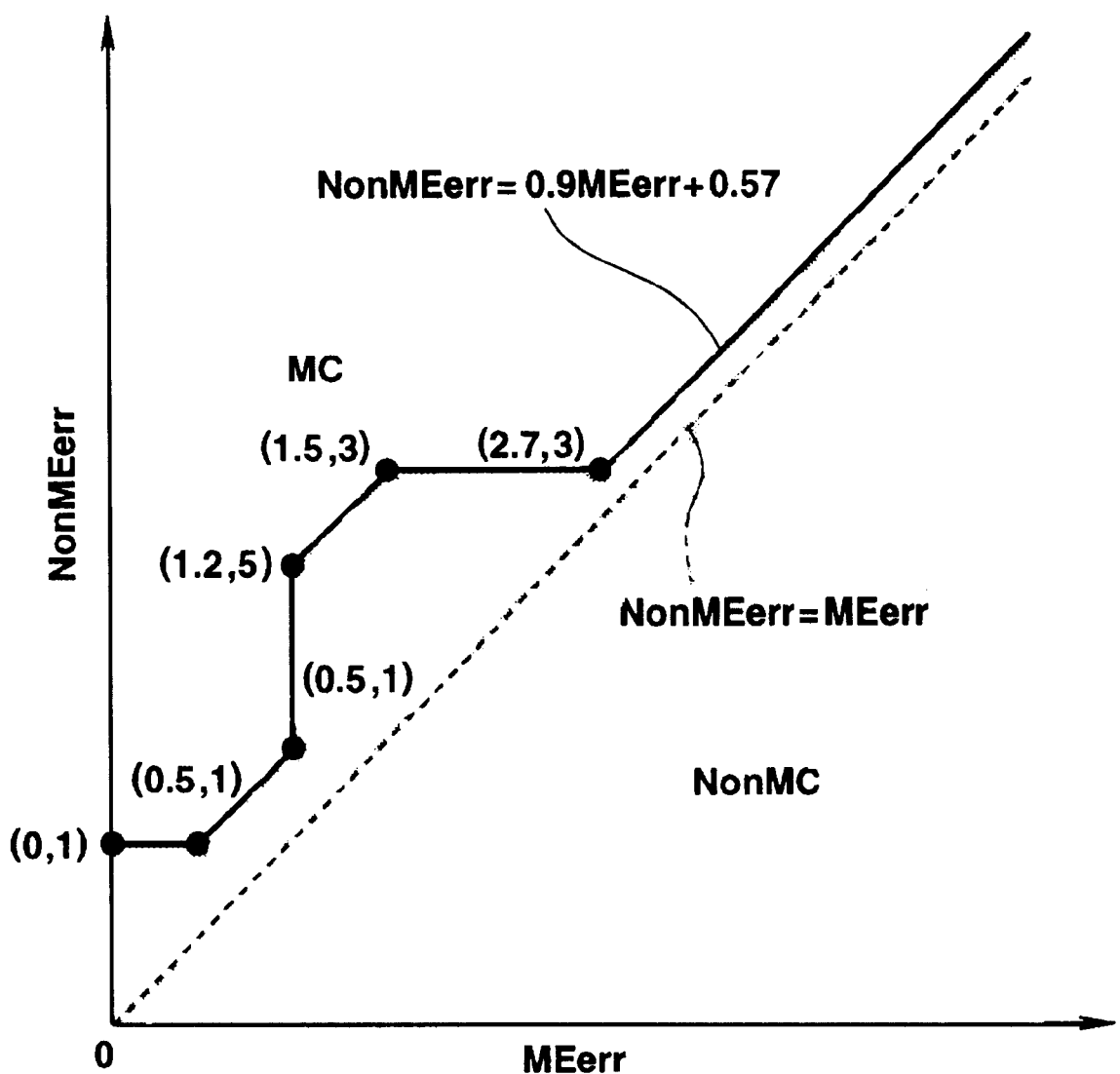
FIG. 5 shows region divisions for making an MC/NonMC decision in the SM3 of the MPEG.

Consequently, in such a case, if the aforementioned area having the small prediction residue is easily determined to be a NonMC in the MC/NonMC decision using the aforementioned region division as shown in FIG. 5, it is possible to improve the subjective image quality even if a part of the image is left as a noise which is difficult to be detected by a human.

On the other hand, it is known that in a macro block corresponding to an object image to be currently coded and a motion compensation prediction reference image, if both have high luminance average values and are flat, a part of the image may be left as a fixed noise, which is easy to be detected by a human.

Consequently, in such a case, in the MC/NonMC decision, by carrying out a normal motion detection without making the MC/NonMC decision for the area having a small motion prediction residue, it is possible to prevent a part of the image from being left as a noise, thus preventing deterioration of the image quality.

According to the present invention, when detecting a motion vector for motion compensative prediction coding, the minimum value of MEerr obtained by the aforementioned Equation (2) and the value of NonMEerr shown in the aforementioned Equation (3) are used to be compared to each other according to a predetermined region division for making the MC/NonMC decision, so that a motion vector (0, 0) can be correctly detected for a motionless macro block, wherein the region division for the MC/NonMC decision is varied at least according to a luminance average value and a value showing the flatness of the macro block of the object image to be currently coded. This enables to eliminate that a part of the image is left as a noise, enhancing the coding efficiency, and to improve the subjective image quality even if a part of the image is left as a fixed noise.

That is, according to the present invention, for example, when a macro block of an input image has a low luminance average value and is flat, motionless, having a small motion prediction residue, the region division as shown in FIG. 5 is used for making the MC/NonMC decision so that the area having the small motion prediction residue is easily selected to be NonMC, which enables to improve the subjective image quality even if a part of the image is left as a fixed noise.

On the other hand, according to the present invention, when the luminance average value is high, during the MC/NonMC decision processing, a normal motion detection is carried out without making the MC/NonMC decision for an area having a small motion prediction residue, which prevents a part of the image from being left as a fixed noise, thus preventing deterioration of the image quality.

Furthermore, when detecting a motion vector according to the method (the aforementioned ACME) using a sum of absolute values of differences of the luminance values in the aforementioned Equation (2) as well as a sum of absolute values of differences in the AC components of the macro block having a motion vector (0, 0) in the aforementioned Equation (4), it is possible to prevent a part of an image from being left as a fixed noise, enabling to improve the coding efficiency, or to improve the subjective image quality even if a part of the image is left as a fixed noise.

That is, if the MC/NonMC decision method according to the present invention is used in combination with the MC/NonMC decision method using the aforementioned CME disclosed in the aforementioned Japanese Patent Laid-Open Hei 8-98187, the MC/NonMC decision can be carried out effectively even for the aforementioned fade image, i.e., even when no motion exists and the luminance value greatly changes between a macro block of an object image to be currently coded and a macro block of the motion prediction reference image.

Here, in a case of a fade image or an image having low luminance values over the entire image and a small motion, it is known empirically that between a macro block corresponding to an object image to be currently coded and a macro block corresponding to a motion prediction reference image, the MEerr of the aforementioned Equation (2) is either equal to or slightly smaller than the ACMEerr of the aforementioned Equation (4) (values concentrate in the area where the ACMEerr is slightly greater). For this, it is preferable that such an area is decided to be NonMC besides an area having a small prediction residue.

Figure 10:
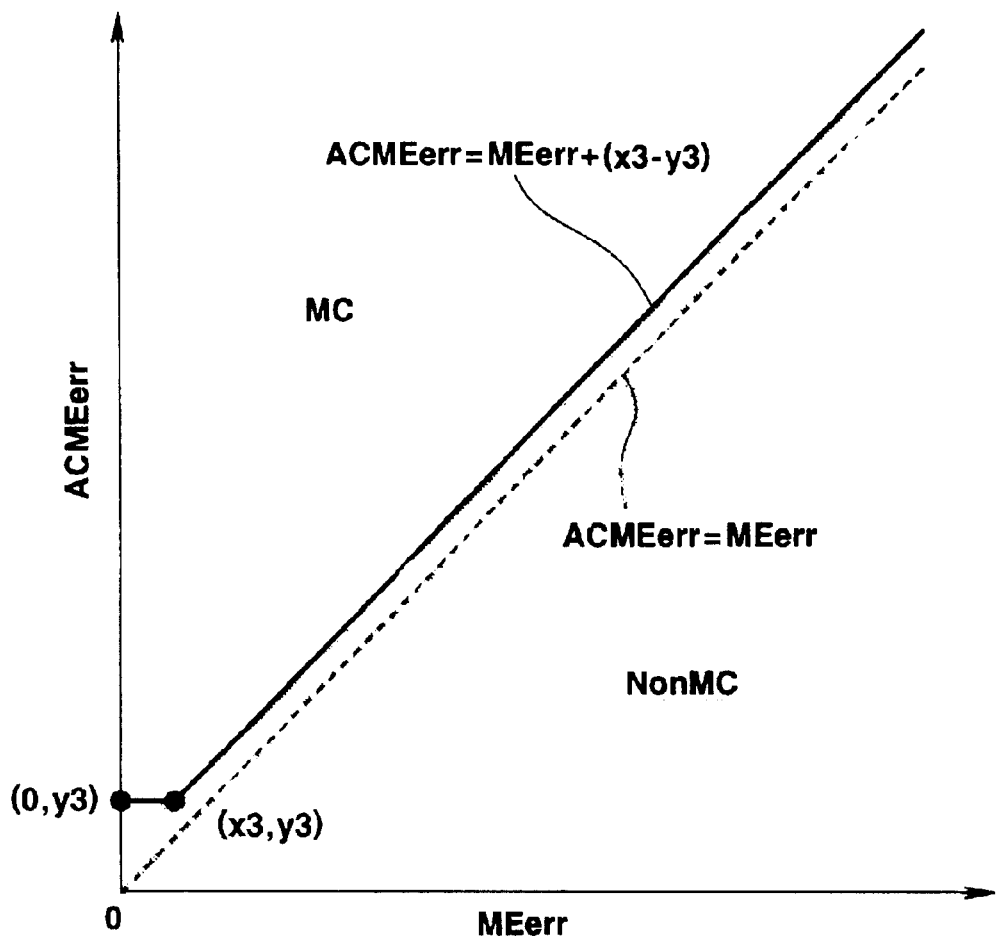
FIG. 10 shows regions divisions for MC/NonMC decision according to an embodiment of the present invention.

Consequently, according to the present invention, as shown in FIG. 10, a region division in which the NonMC region is increased is used so that the motion vector can easily be detected as (0, 0). That is, in FIG. 10, the vertical axis represent the aforementioned ACMEerr and the horizontal axis represents the aforementioned motion prediction residue MEerr, and the MC/NonMC decision is made not according to the region division by ACMEerr=MEerr indicated by a dotted line in the figure but according to a region division indicated by a solid line in the figure consisting of a straight line connecting (0, y3) to (x3, y3) and a straight line of ACMEerr=MEerr+(x3−y3). When the aforementioned MEerr value is compared to the ACMEerr value, the decision is made to be MC if in the upper left of the aforementioned solid line, and the decision is made to be NonMC if in the lower right of the aforementioned solid line. By using this region division shown in FIG. 10, it is possible to increase the coding efficiency and to increase the subjective image quality of the reproduced image.

Figure 8:
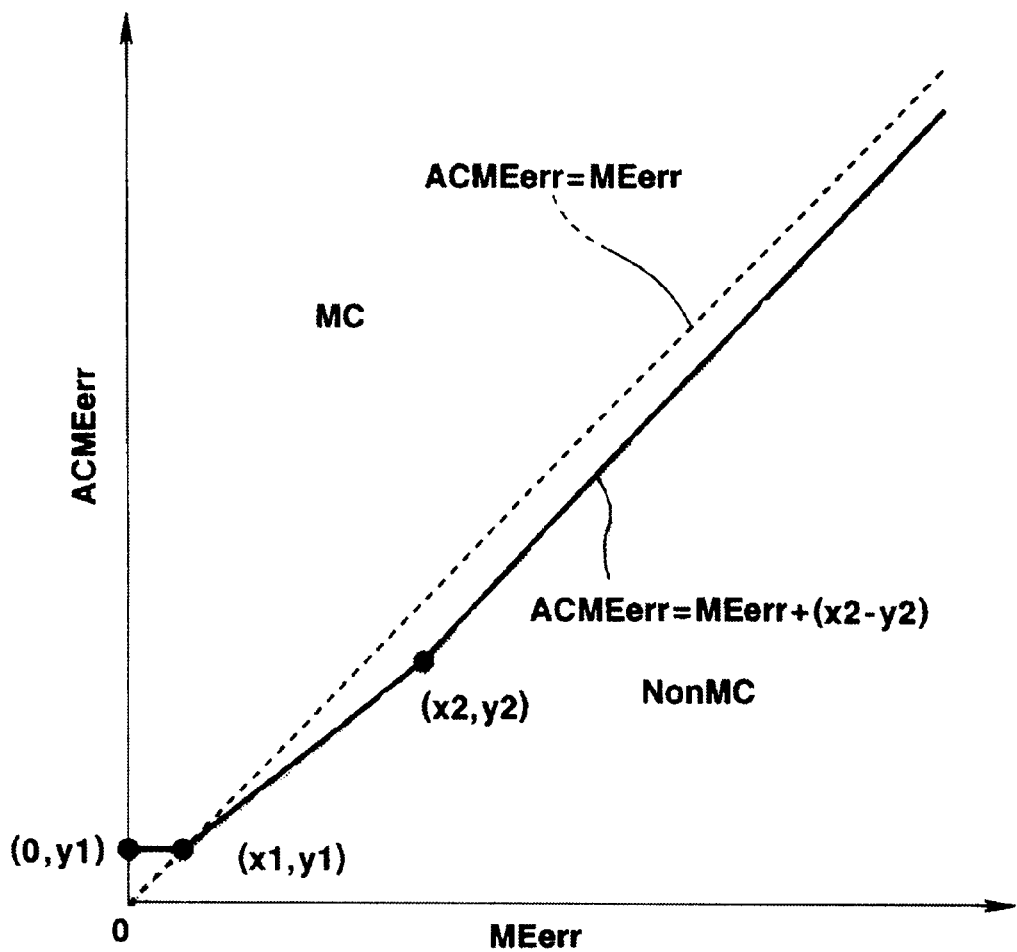
FIG. 8 shows regions divisions for making an MC/NonMC decision using a sum of absolute values of differences in the AC components.

It should be noted that for the images other than the above mentioned, the region division shown in FIG. 8 is used for making the MC/NonMC decision.

As has thus far been described, according to the present invention, it is possible to improve the subjective image quality and enhance the coding efficiency even for a flat portion of an input image having a small prediction residue.

Description will now be directed to specific embodiments of the present invention.

Figure 11:
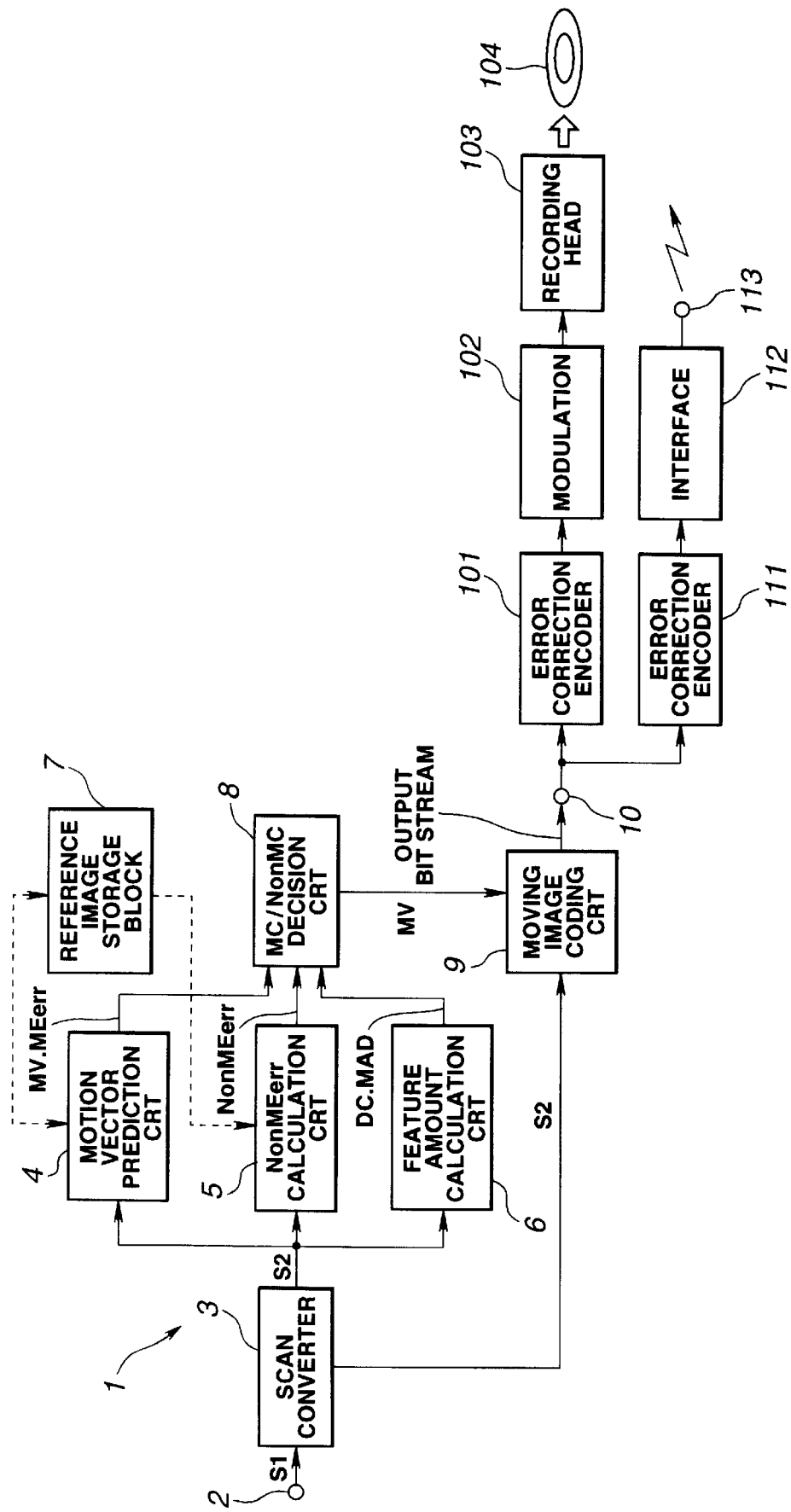
FIG. 11 is a block diagram showing a configuration example of a moving image signal coding apparatus according to the first embodiment of the present invention.

FIG. 11 is a block diagram showing configuration of an image signal coding apparatus 1 according to a first embodiment which employs the image signal coding method and image signal transmission method according to the present invention. In this embodiment of the present invention, the dynamic image signal coding apparatus 1 carries out hybrid coding using the motion compensative prediction and the DCT in combination.

Figure 1:
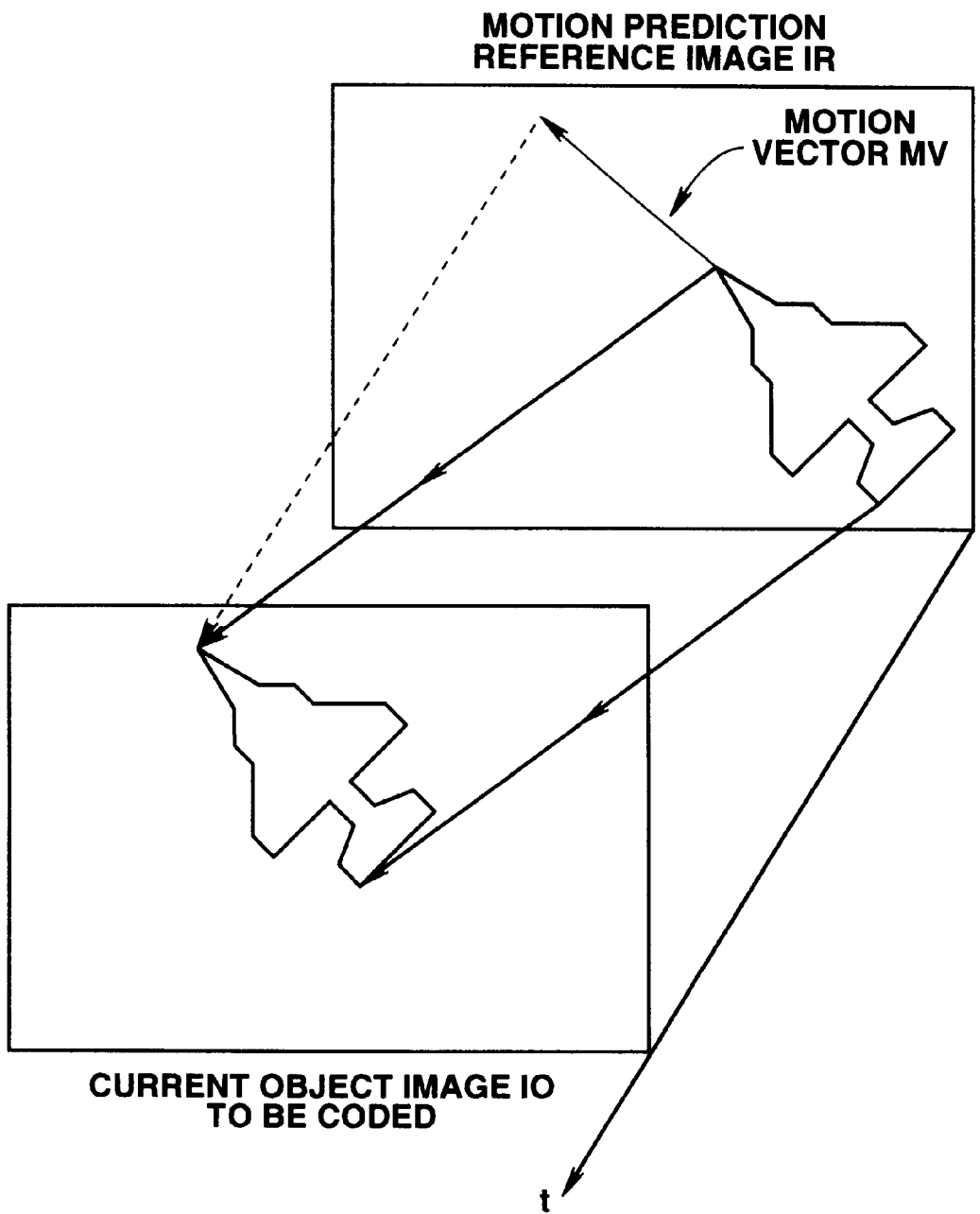
FIG. 1 explains the principle of motion compensation.
Figure 2:
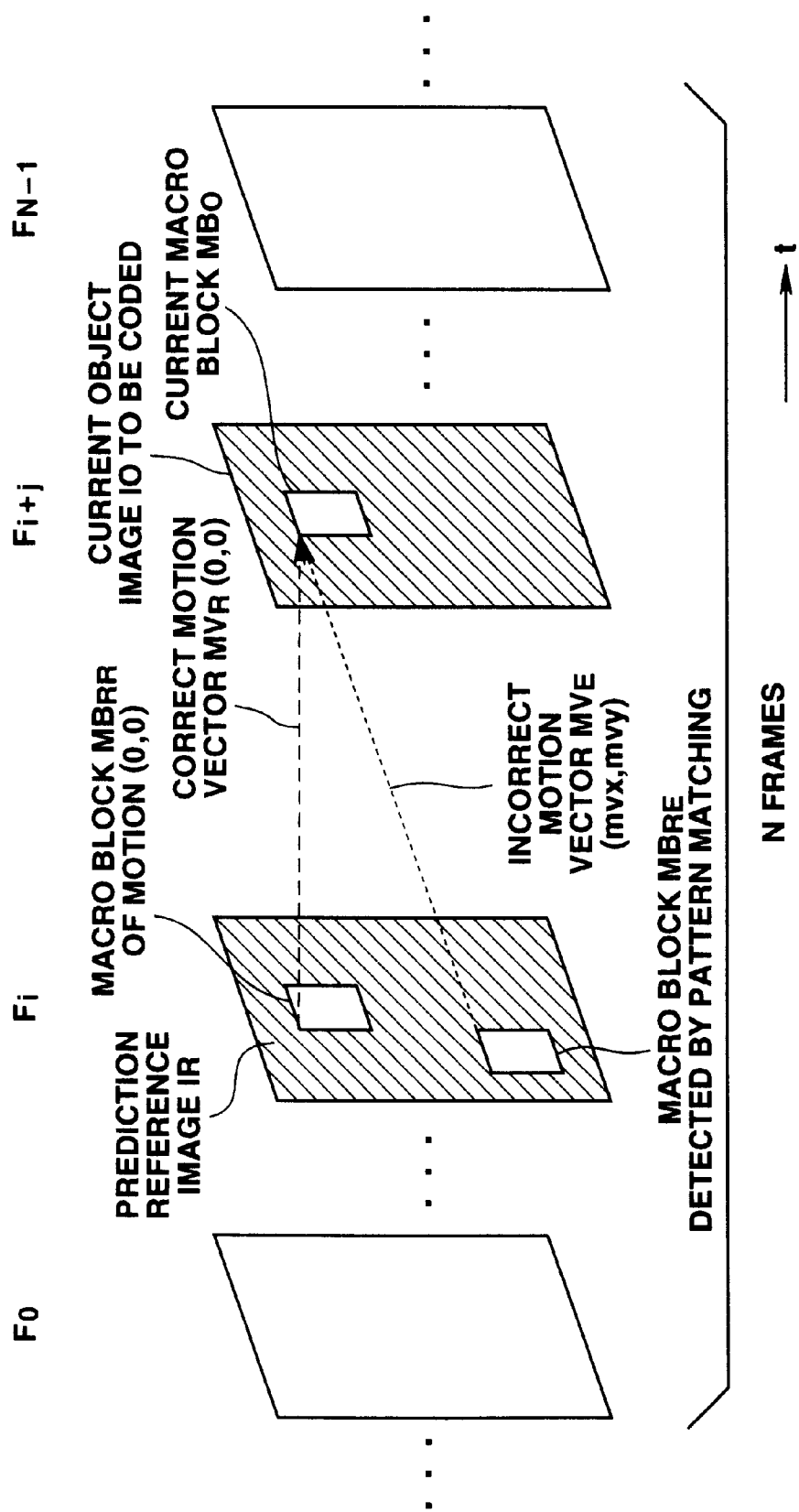
FIG. 2 shows a motion compensation and a non-motion compensation.
Figure 3:
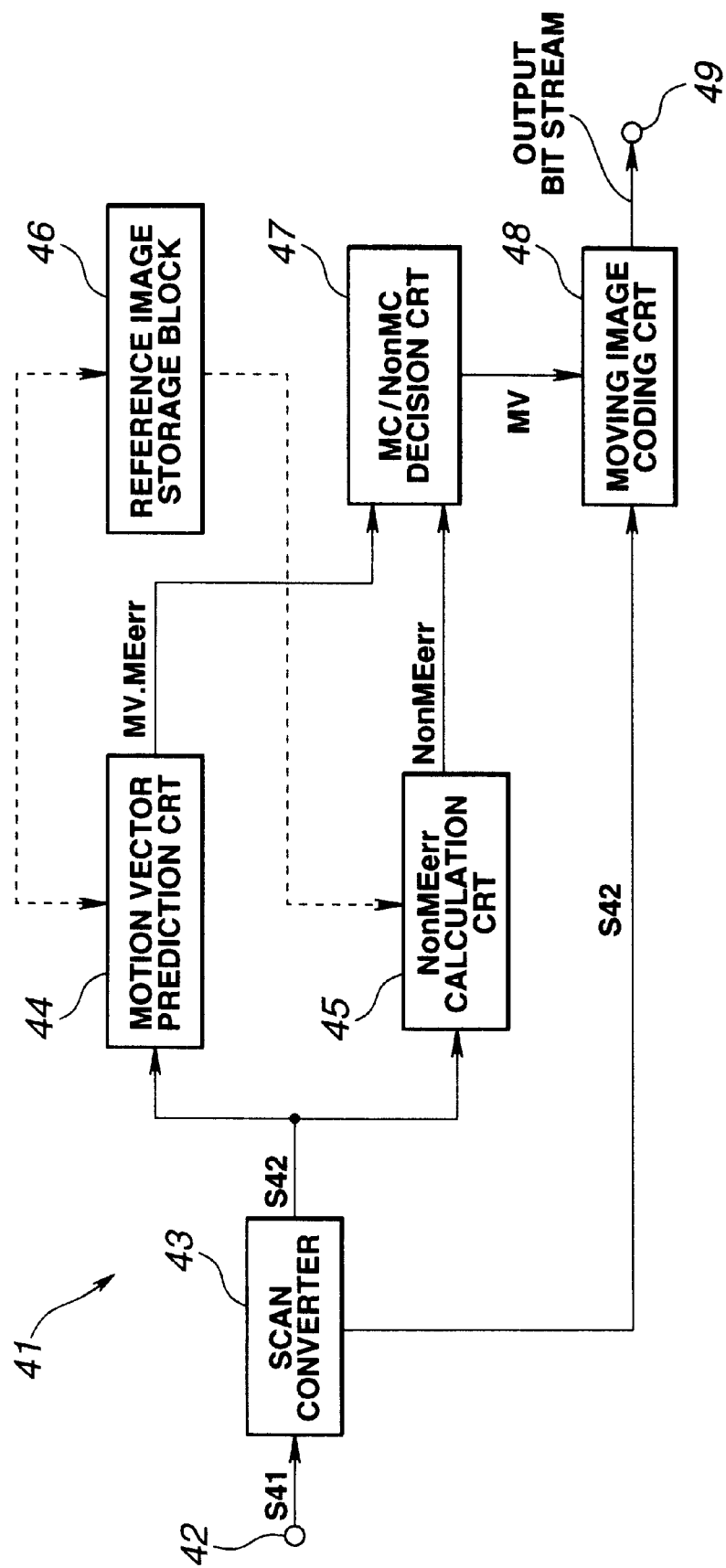
FIG. 3 is a block diagram showing a configuration example of a moving image signal coding apparatus of SM3 of the MPEG.
Figure 4:
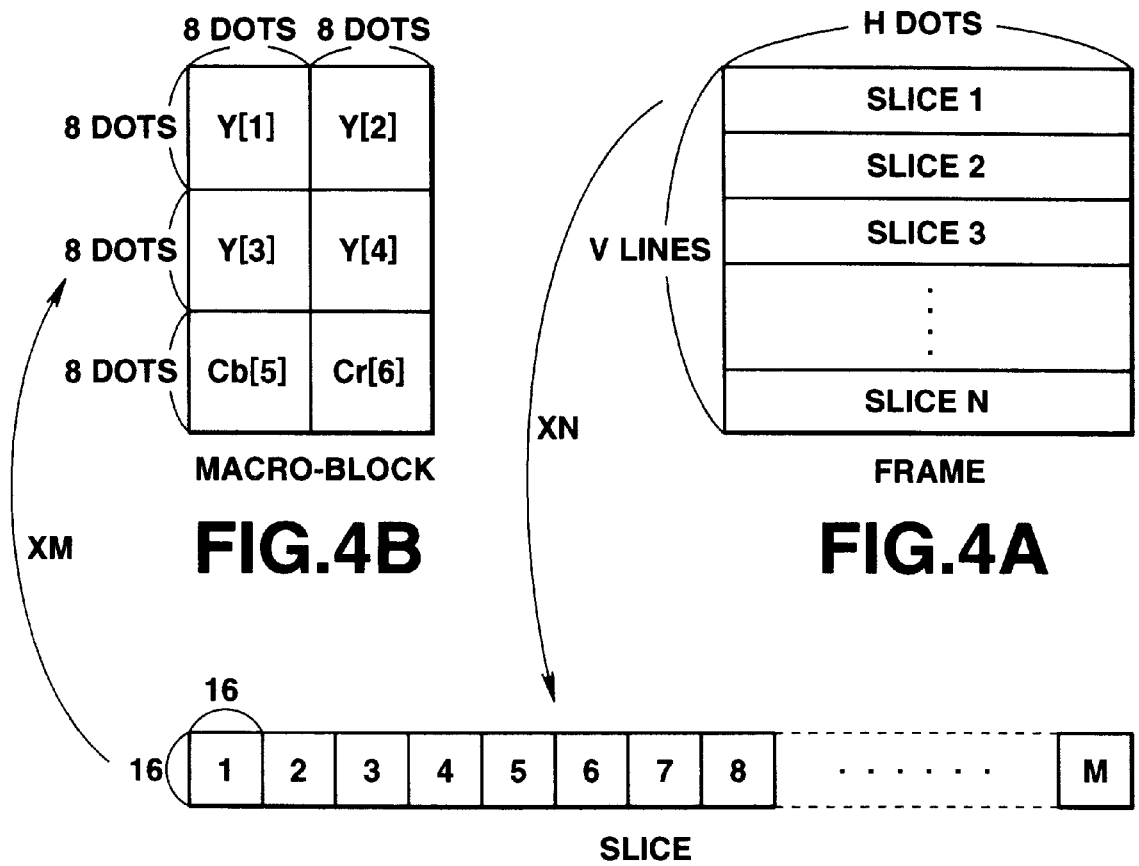
FIG. 4 shows configuration of an image data.

In FIG. 10, an input moving image signal S1 inputted from a terminal 2 is transmitted to a scan converter 3. In the scan converter 3, an image signal inputted by raster scan is converted into a block format signal. That is, as has been explained with reference to FIG. 4, the input moving image signal S1 is a data formatted on frame basis consisting of H dots×V lines. The signal of this one frame is divided into N slices, each consisting of 16 lines, and each of the slices is divided into M macro blocks. Each of the macro blocks consists of luminance signals corresponding to 16×16 pixels (dots). The luminance signal is divided into four blocks Y[1] to Y[4], each consisting of 8×8 dots. Moreover, a color difference signal Cb[5] of 8×8 dots and a color difference signal Cr[6] of 8×8 dots are assigned for this luminance signal of 16×16 dots.

The moving image signal S2 which has been converted by the scan converter 3 into the block-formatted signal is transmitted to a motion vector prediction circuit 4, a Non-MEerr calculation circuit 5, a feature amount calculation circuit 6 and a moving image coding circuit 9.

The motion vector prediction circuit 4 carries out a pattern matching (between an object image to be currently coded and a reference image for each of the macro blocks) for each of the macro blocks of each of the frames of the moving image signal S2 successively inputted with a predetermined search range of reference image stored in a reference image storage block 7. According to a result of this pattern matching, a motion vector MV is detected and simultaneously with this, the aforementioned Equation (2) is used for calculating a motion prediction residue MEerr. The motion vector MV detected and the motion prediction residue MEerr calculated are transmitted to an MC/NonMC decision circuit 8.

This moving image signal coding apparatus 1, upon completion of prediction of all the motion vectors of the macro blocks in a frame, stores the current moving image signal S2 (i.e., image data of the one frame) in the reference image storage block, so as to serve as a reference image for the next image to be inputted.

On the other hand, the NonMEerr calculation circuit 5 calculates a non-motion compensative residue NonMEerr for each of the macro blocks of each of the frames of the moving image signal S3 which are successively inputted. That is, the NonMEerr calculation circuit 5 is supplied with the moving image signal S2 on frame basis, i.e., successively supplied with macro blocks contained in an object image to be currently coded, and calculates a difference between each of the blocks and a macro block having a motion vector (0, 0) among the macro blocks in the reference image stored in the reference image storage block 7. These differences are outputted as non-motion compensative residue NonMEerr for each of the macro blocks. The non-motion compensative residue NonMEerr is obtained by the aforementioned Equation (3).

The non-motion compensative residue NonMEerr thus obtained is transmitted to the MC/NonMC decision circuit 8.

The feature amount calculation circuit 6 calculates an average luminance value DC and a value MAD indicating the flatness for each of the macro blocks of each frame of the moving image signal S2 successively inputted. Here, as the average luminance value DC of a macro block, for example, an average of the sum of absolute values of luminance values Si,j in a macro block is obtained as shown in Equation (7) below.

$$DC = \Sigma |S_{i,j}|/256 \, (i=0 \text{ to } 15, j=0 \text{ to } 15) \qquad (7)$$

As the value MAD indicating the flatness, for example as shown in Equation (8) below, it is possible to obtain a sum of absolute values of differences between the luminance values Si,j and the average luminance values DC in a macro block.

$$MAD = \Sigma |S_{i,j} - DC| \, (i=0 \text{ to } 156, j=0 \text{ to } 15) \qquad (8)$$

The average luminance value DC and the flatness value MAD thus calculated for the macro block are outputted to the MC/NonMC decision circuit 8.

Thus, the MC/NonMC decision circuit 8 is supplied with the motion vector MV and the motion prediction residue MEerr from the motion vector prediction circuit 4; the non-motion compensative residue NonMEerr from the NonMEerr calculation circuit 5; and the macro block average luminance DC and the flatness value MAD from the feature calculation circuit 6. According to these data supplied, the MC/NonMC decision circuit 8 carries out an MC/NonMC decision while changing the region division for making the MC/NonMC decision as has been described above as the principle of the present invention.

That is, more specifically, the MC/NonMC decision circuit 8 carries out the MC/NonMC decision for the input moving image signal S2 if both of the macro block average luminance value DC and the flatness value MAD supplied are found to be above predetermined thresholds, and makes a decision of MC without using NonMC if both of the values are below the aforementioned thresholds.

Here, operation of this MC/NonMC decision circuit 8 will be explained below with reference to a flowchart of FIG. 12.

Figure 12:
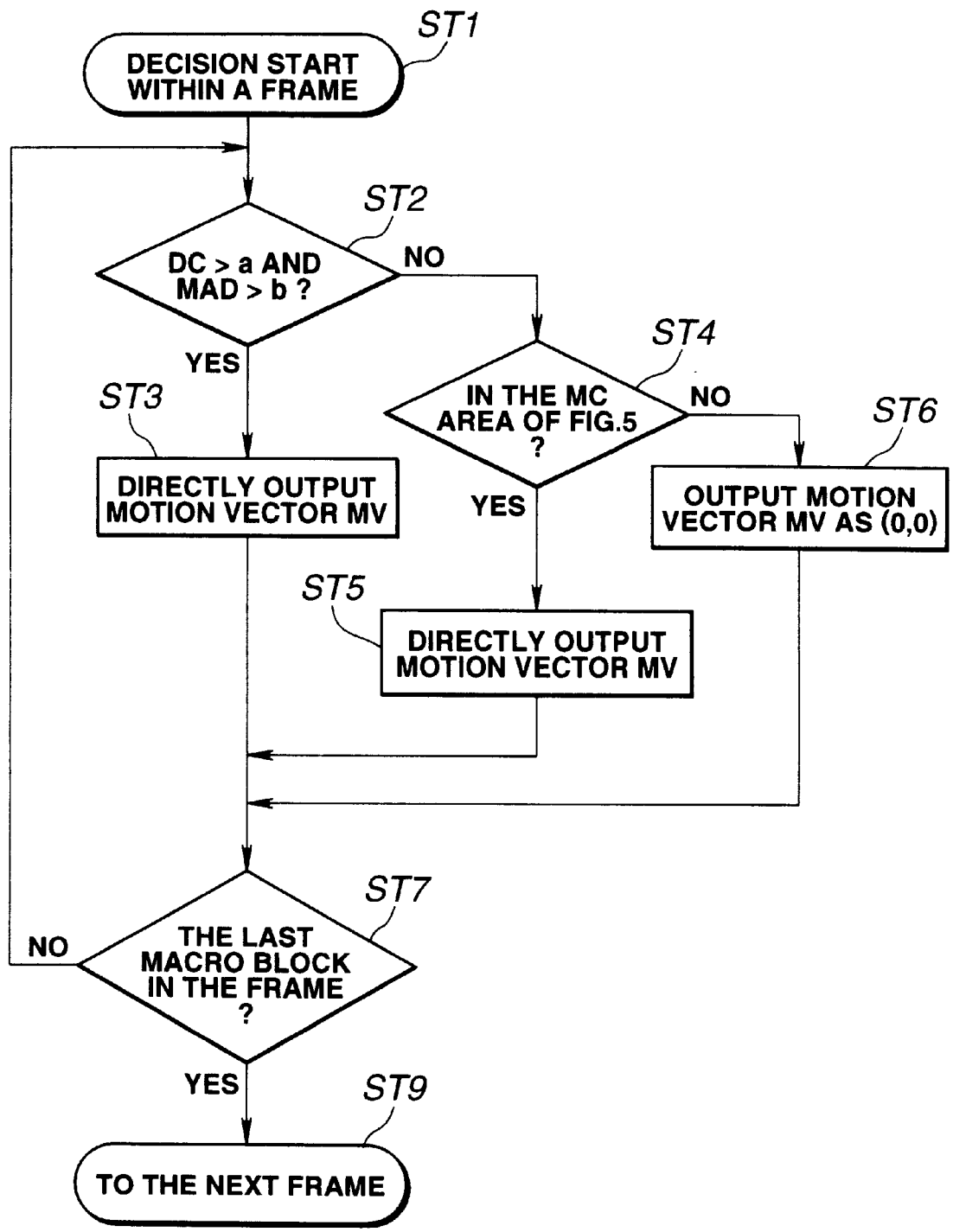
FIG. 12 is a flowchart explaining operation of the MC/NonMC decision according to the first embodiment.

Firstly, in step ST1 of FIG. 12, the MC/NonMC decision is started for each of the macro blocks in a frame currently to be coded.

In step ST2, the macro block average luminance value DC and the flatness value MAD are respectively compared to predetermined values, i.e., whether DC>a and MAD>b. If it is decided in this step ST2 that DC>a and MAD>b, the normal motion prediction compensation is selected and control is passed to step ST3. On the other hand, if it is decided in step ST2 that the condition DC>and MAD>b is not satisfied, the region division shown in FIG. 5 is selected and control is passed to step ST4. Here, it is assumed, for example, that a =60 and b=384.

In the aforementioned step ST3, the normal motion compensation prediction is carried out and a motion vector MV is outputted as it is, passing control to step ST7. Note that the motion vector MV outputted is supplied to the moving image coding circuit 9 together with the moving image signal S2 of the macro block.

Moreover, in step ST4, the MC/NonMC decision is carried out according to the region division of FIG. 5. In this step ST4, if a comparison of the aforementioned prediction residue MEerr to the non-motion compensative residue NonMEerr results in the MC region of FIG. 5, control is passed to step ST5, where the decision result is made to be MC. Otherwise, control is passed to step ST6, where the decision result is made to be NonMC. It should be noted that in FIG. 5, the solid line itself is included in the MC region.

In step ST5, the motion vector MV supplied is outputted as it is and control is passed to step ST7. Moreover, in step ST6, the motion vector MC is converted to (0, 0), which is outputted, passing control to step ST7. It should be noted that these motion vectors MS which have been outputted are supplied to the moving image coding circuit 9 together with the moving image signal S2 of the macro block.

In step ST7, it is determined whether the current macro block is the last macro block in the frame. If it is determined that the current macro block is the last macro block in the frame, control is passed to step ST9. Otherwise, control is returned to step ST2 for carrying out the next macro block.

In step ST9, the MC/NonMC decision is completed for the frame of the object image to be currently coded. The processing of the flowchart of FIG. 12 is carried out for the next frame as the object image to be coded.

As has been described above, the MC/NonMC decision circuit 8 carries out the MC/NonMC decision.

Figure 6:
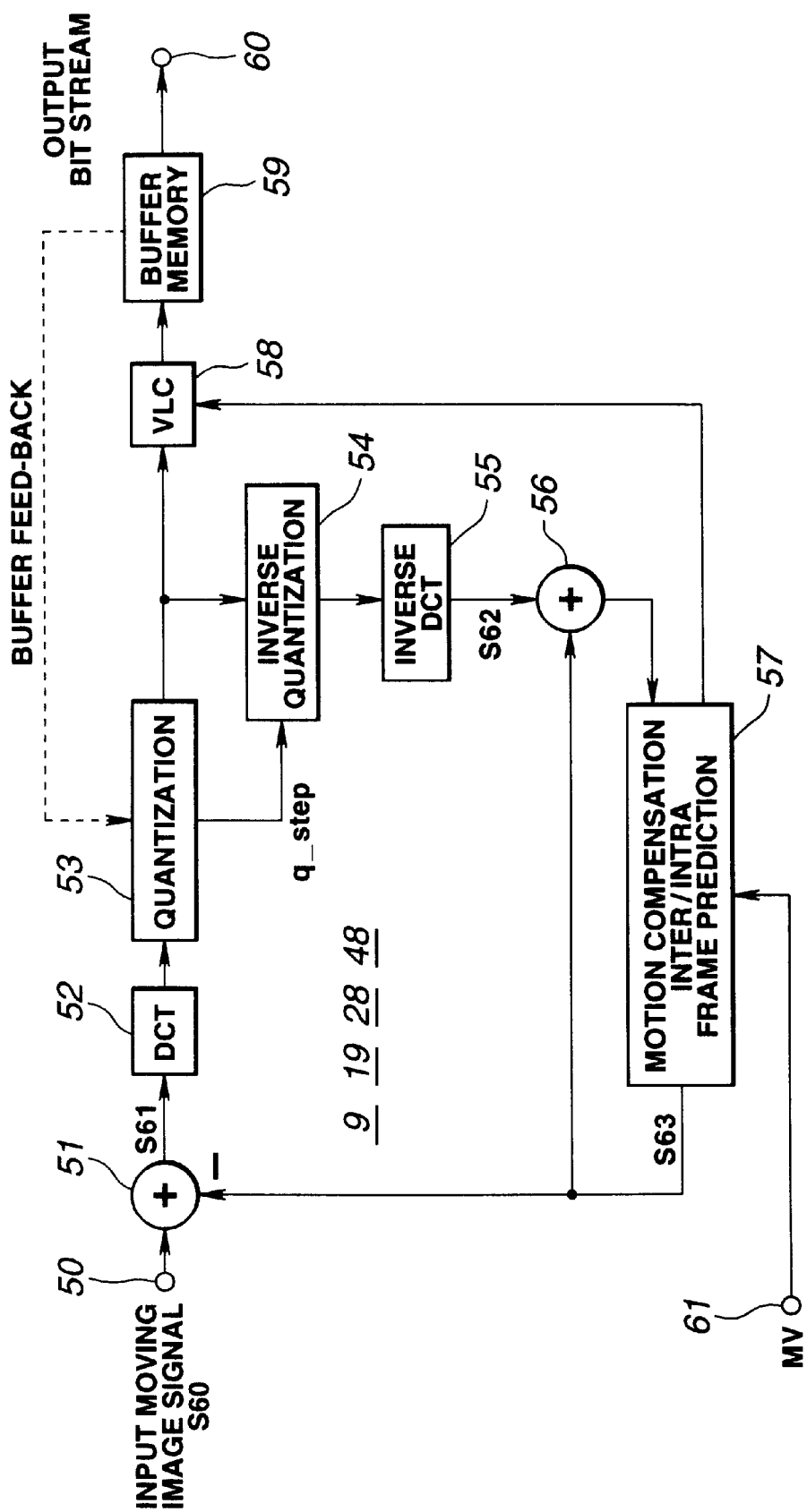
FIG. 6 is a block diagram showing a configuration example of a moving image coding circuit in the moving image signal coding apparatus.
Figure 7:
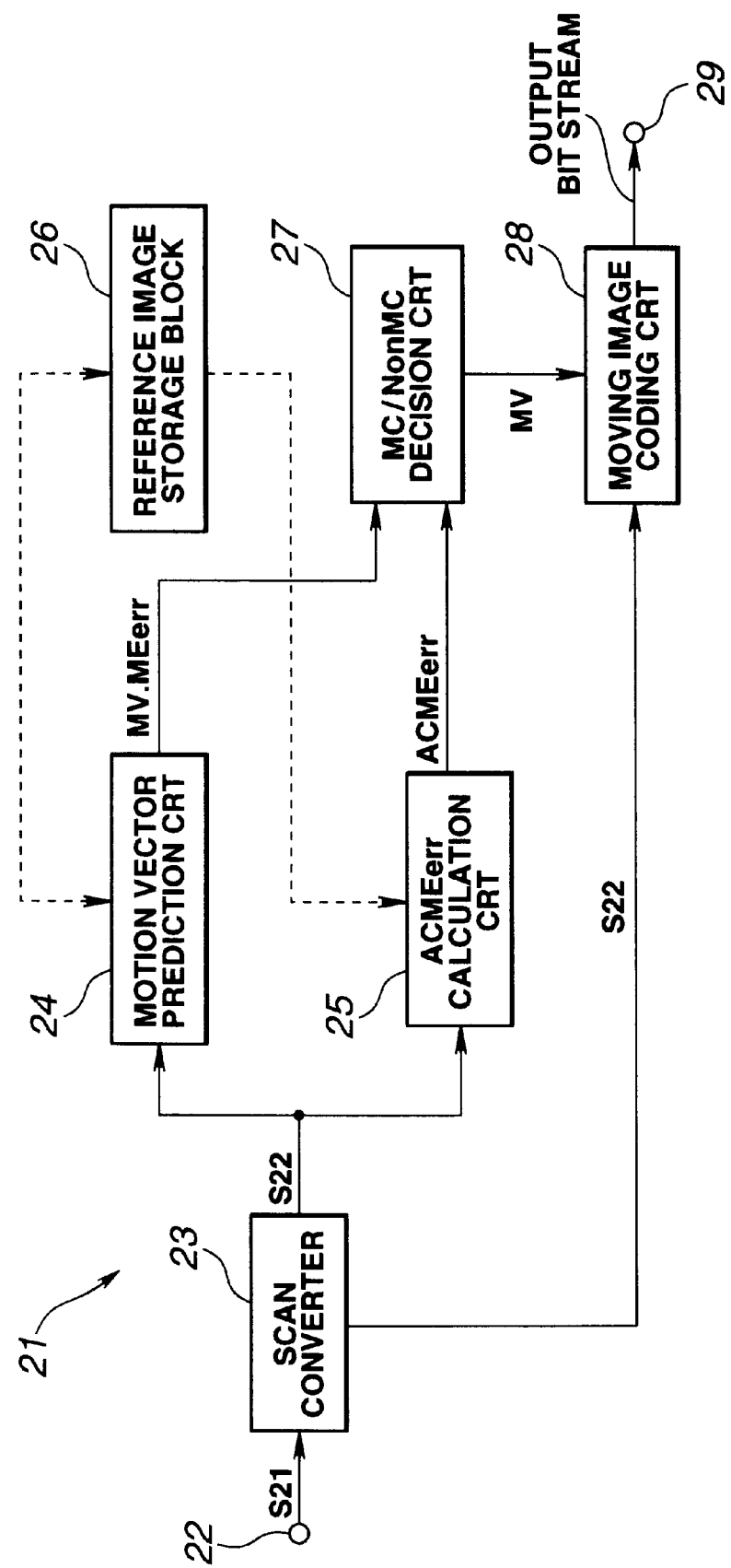
FIG. 7 is a block diagram showing a configuration example of the moving image signal coding apparatus which carries out an MC/NonMC decision using a sum of absolute values of differences in the AC components.

The moving image coding circuit 9 having configuration identical to that of FIG. 6 carries out operation identical to that of FIG. 6 and its explanation is omitted. It should be noted that the input moving image signal S60 in FIG. 6 corresponds to the moving image signal S2 supplied from the scan converter 3 in FIG. 11; and the aforementioned terminal 61 is supplied with the motion vector MV from the MC/NonMC decision circuit 8 in FIG. 11.

Figure 13:
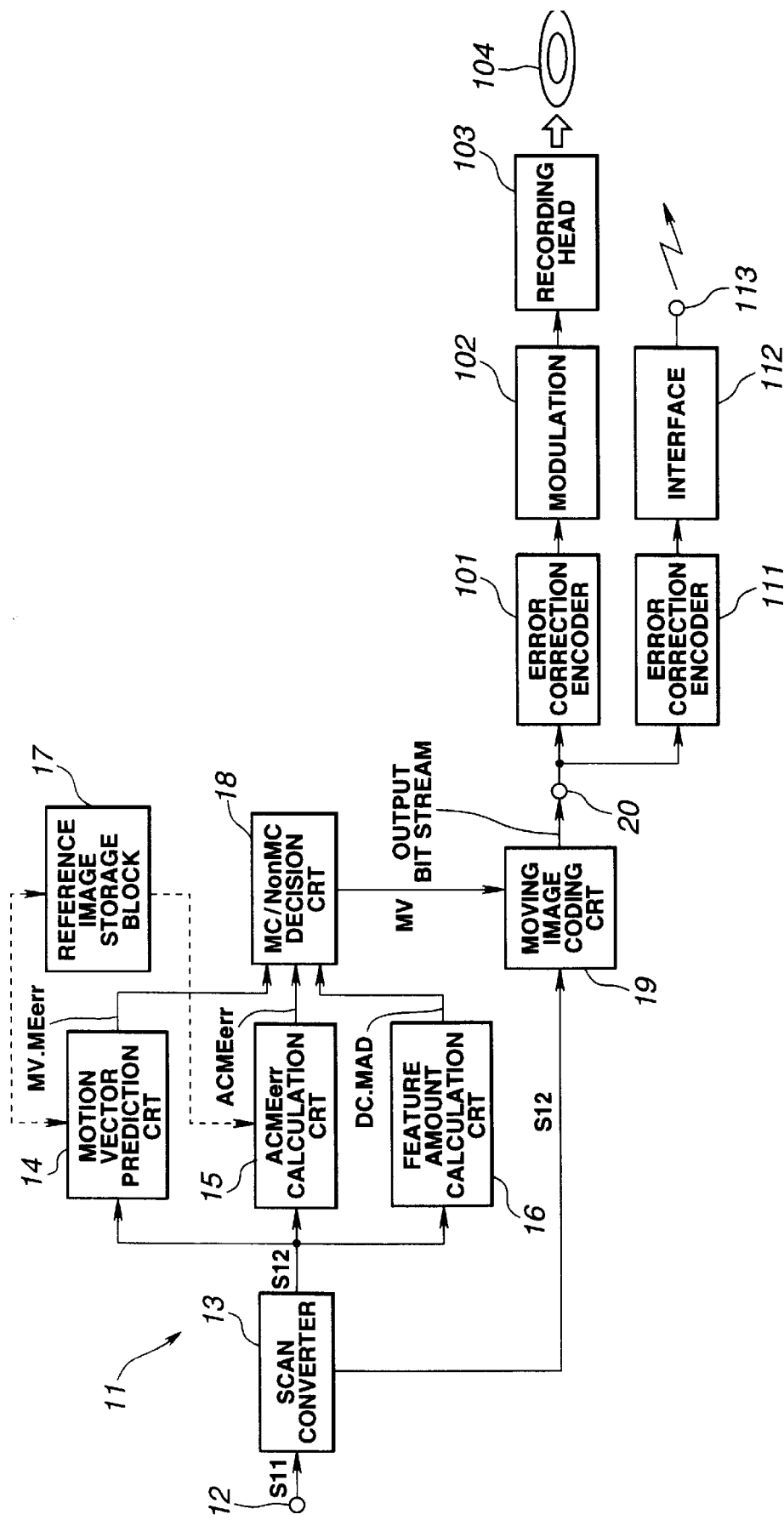
FIG. 13 is a block diagram showing a configuration example of a moving image signal coding apparatus according to a second embodiment of the present invention.

Next, FIG. 13 shows a second configuration example of the image signal coding apparatus 11 which employs the image signal coding method and image signal transmission method according to a second embodiment the present invention.

Here, in the second configuration example shown in FIG. 13, the NonMEerr calculation circuit 5 contains in the first configuration example of FIG. 11 is replaced by an ACMEerr calculation circuit 15 for calculating the aforementioned ACMEerr for making the MC/NonMC decision. This enables to effectively carry out the MC/NonMC decision even for a fade image, for example.

The second configuration example shown in this FIG. 13 includes the ACMEerr calculation circuit 15 and an MC/NonMC decision circuit 18 which will be detailed later. The other components of the second configuration example, i.e., an input terminal 12, a scan converter 13, a motion vector prediction circuit 14, a feature amount calculation circuit 16, a reference image storage block 17, a moving image coding circuit 19, and an output terminal 20 respectively correspond to the input terminal 2, the scan converter 3, the motion vector prediction circuit 4, the feature amount calculation circuit 6, the reference image storage block 7, the moving image coding circuit 9, and the output terminal 10 of FIG. 11, operating identically, and their explanations are omitted. Moreover, the signal S12 in FIG. 13 corresponds to the input moving image signal S2 in the moving image coding circuit 9 of FIG. 11.

In the ACMEerr calculation circuit of this FIG. 13, the aforementioned Equations (4), (5), and (6) are used so as to obtain the sum ACMEerr of absolute values of differences in the AC components between the macro block to be currently coded and the macro block of the reference image having a motion vector (0, 0).

The MC/NonMC decision circuit 18 is supplied with a macro block average luminance value DC and a flatness value MAD, according to which a region division is selected for carrying out the MC/NonMC decision for the input moving image signal S12. The region division selected and the motion prediction residue MEerr and the ACMEerr inputted are used to carry out the MC/NonMC decision.

Hereinafter, operation of the MC/NonMC decision circuit 18 of FIG. 13 will be explained with reference to a flowchart of FIG. 14.

Figure 14:
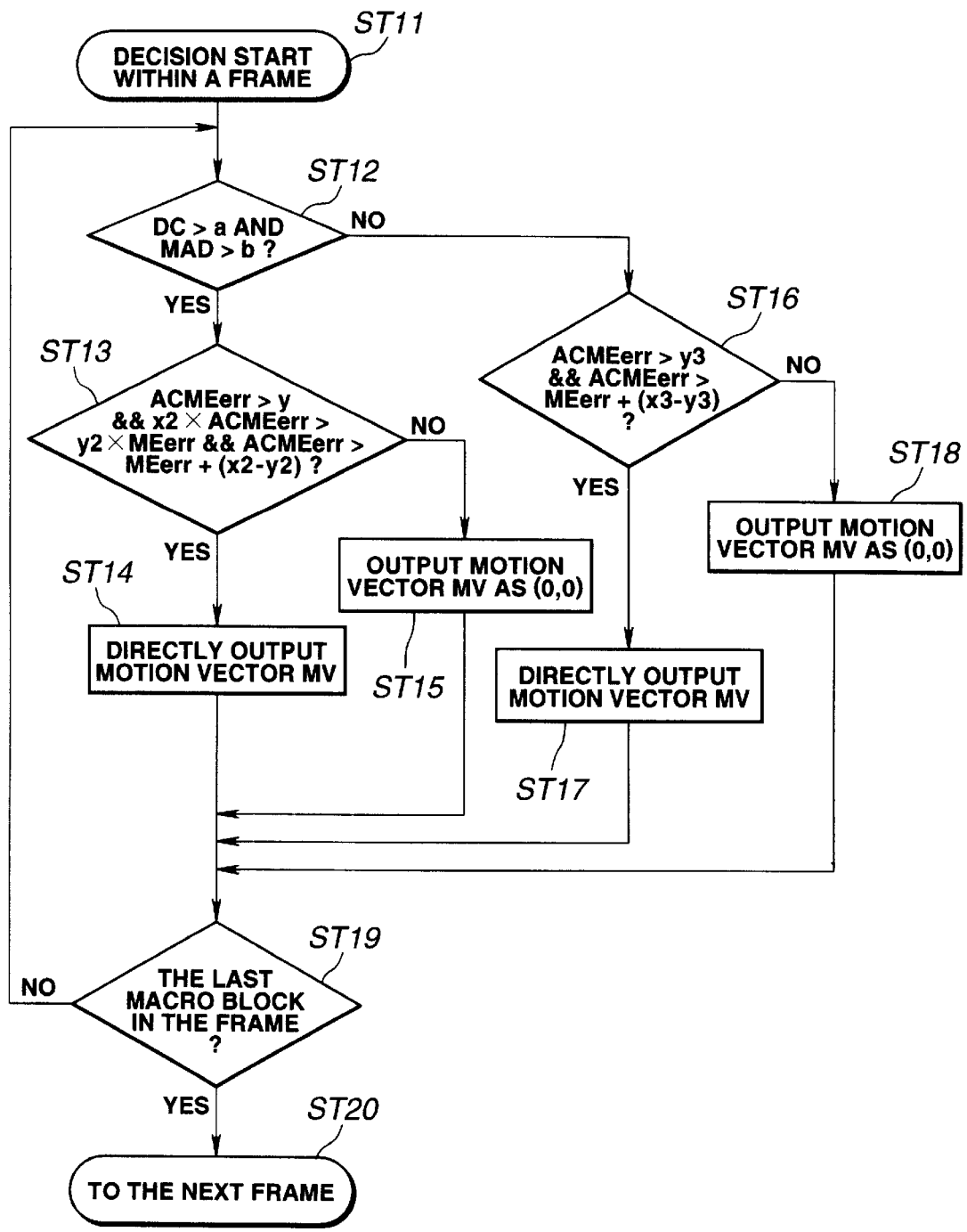
FIG. 14 is a flowchart explaining operation of the MC/NonMC decision according to the second embodiment.

Firstly, in step ST11 of FIG. 14, the MC/NonMC decision is started for each of the macro blocks in the frame to be currently coded.

In step ST12, it is decided whether the macro block average luminance value DC and the flatness value MAD satisfy DC>a and MAD>b. If it is decided in this step ST12 that DC>a and MAD>b are both satisfied, the region division of FIG. 8 is selected and control is passed to step ST13. On the other hand, if it is decided in step ST12 that CD>a and MAD >b are not satisfied, the region division of FIG. 10 is selected and control is passed to step ST16. Here, it is assumed for example that a=60 and b=384.

In step ST13, the MC/NonMC decision is carried out according to the region division of FIG. 8. That is, in this step ST13, the region division of FIG. 8 is used to determine whether Equations (9) to (11) below are all satisfied. If all of the Equations (9) and (11) are satisfied, an MC is identified, and control is passed to step ST14. Otherwise, a NonMC is identified and control is passed to step ST15.

$$ACMEerr > y1 \qquad (9)$$

$$x2 \times ACMEerr > y2 \times MEerr \qquad (10)$$

$$ACMEerr > MEerr + (x2 - y2) \qquad (11)$$

In step ST14, a motion vector MV inputted is outputted as it is, passing control to step ST19. On the other hand, in step ST15, a motion vector MV inputted is converted into (0, 0), which is outputted, passing control to step ST19. These motion vectors MV which have been outputted are supplied to the moving image coding circuit 19 together with the moving image signal S12 of the macro block.

Moreover, in step ST16, the MC/NonMC decision is carried out according to the region division of FIG. 10. That is, in this step ST16, the region division of FIG. 10 is used to determine whether Equations (12) and (13) below are both satisfied. If both of the Equations (12) and (13) are satisfied, an MC is identified, passing control to step ST17. Otherwise, a NonMC is identified, passing control to step ST18.

$$ACMEerr > y3 \qquad (12)$$

$$ACMEerr > MEerr + (x3 - y3) \qquad (13)$$

In step ST17, a motion vector MV which has been inputted is outputted as it is, passing control to step ST19. On the other hand, in step ST18, a motion vector inputted is converted into (0, 0), which is outputted, passing control to step ST19. The motion vectors MS which have been outputted are supplied to the moving image coding circuit 19 together with the moving image signal S12 of the macro block.

In step ST19, it is determined whether a current macro block is the last macro block within the frame. If it is determined in this step ST19 that the current macro block is the last macro block in the frame, control is passed to step ST20. Otherwise, control is returned to step ST12 for processing the next macro block.

In step ST20, the <C/NonMC decision is completed for the frame of the current object image to be coded, and the processing of the flowchart of FIG. 14 is carried out for the next frame as the object image to be coded.

Thus, the MC/NonMC decision circuit 18 carries out the MC/NonMC decision.

The moving image coding circuit 19 of FIG. 13 operates identically as the moving image coding apparatus 9 of FIG. 10 (i.e., configuration of FIG. 6) and its explanation is omitted. It should be noted that the input moving image signal S60 of FIG. 6 corresponds to the moving image signal S12 supplied from the scan converter 13 in FIG. 13, and the terminal 61 is supplied with a motion vector MV from the MC/NonMC decision circuit 18 in FIG. 13.

As has thus far been described, in the moving image signal coding apparatus according to the embodiment of the present invention, when coding a moving image signal by way of motion compensative prediction using a predetermined prediction image signal, an average luminance value and a flatness values are calculated using an image signal of a macro block (a predetermined image unit), and according to the average luminance value and the flatness obtained, it is decided whether to apply to the image signal of the macro block a motion comensative prediction or prediction without motion compensation, thus coding a current image.

According to the above configuration, the MC/NonMC decision is made when carrying out a prediction, which reduces motion compensation which may lower the coding efficiency. Moreover, by selectively using the MC/NonMC decision according to an average luminance value and a flatness value of an image signal on macro block basis, it is possible to carry out the MC/NonMC decision with a higher efficiency. Consequently, these effects enhance the moving image coding efficiency, enabling to significantly improve the subjective image quality.

It should be noted that in the second configuration example above described, explanation was given on use of AC components as an index for making the MC/NonMC decision. However, the present invention is not limited to this embodiment but can employ a color difference value or the like as an index for making the MC/NonMC decision. In such a case, in FIG. 11 or FIG. 13, the NonMEerr calculation circuit 5 and the ACMEerr calculation circuit 15 are replaced by a color difference value calculation circuit for each of the macro blocks. In this case, the MC/NonMC decision circuit in FIG. 11 or in FIG. 13, uses the color difference value for making the MC/NonMC decision instead of using the aforementioned NonMEerr and the ACMEerr.

Moreover, in the second configuration example above described, the ACMEerr is obtained by Equation (4). However, the present invention is not limited to such a method but can use a difference of deviation of the luminance value or the like to obtain the ACMEerr.

Furthermore, in the aforementioned second configuration example, two types of region division are prepared for making the MC/NonMC decision, which can be selectively used according to a feature amount of the macro block. It is possible to prepare more than two region division types, which are switched between one another in multiple stages.

Thus, it is possible further improve the motion compensation/non-motion compensation decision efficiency.

Description will now be directed to a coded bit stream (output bit stream) obtained by coding in the moving image signal coding apparatus according to the first embodiment and the second embodiment. The coded bit stream is recorded onto a signal recording medium or transmitted through a transmission path according to the present invention.

That is, the output bit stream from the moving image coding circuit 9 in FIG. 11 and the moving image coding circuit 19 in FIG. 13 is recorded on a signal recording medium such as an optical disc 104 or transmitted to a transmission path.

In a case when the aforementioned output bit stream is recorded on the optical disc 104 in FIG. 11 and FIG. 13, the output bit stream and a quantization scale outputted from the output terminal 10 or 20 are followed by a data string consisting of information required for decoding which is supplied with an error correction code by an error correction encoder (ECC encoder) 101 and transmitted to a modulation circuit 102. In the modulation circuit 102, the output from the aforementioned error correction encoder 101 is subjected to a predetermined modulation processing such as a so-called 8–14 modulation (EFM: Eight to Fourteen Modulation) or 8–16 modulation or the like. These modulations convert the aforementioned encoded data (8-bit) into a 14-bit or 16-bit data so that a digital signal is matched with the transmission characteristic of the optical disc 104. The output from this modulation circuit 102 is transmitted to a recording head 103, and recorded on the optical disc 104 by this recording head 103. It should be noted that in the case of FIG. 11 and FIG. 13, an optical disk is used as the signal recording medium. However, the signal recording medium may be a magnetic disc medium such as a hard disc and a flexible disk, or a tape-shaped recording medium such as a magnetic tape, or a semiconductor recording medium such as an IC card and various memory devices. Moreover, the optical disk may a disc on which bits are formed physically for recording and a magneto-optical disc as well as a phase change type disc, an organic pigment type optical disc, an optical disk on which recording is carried out using an ultraviolet laser beam, an optical disk having a multiple recording films and the like.

On the other hand, when the output is transmitted to a transmission path, the aforementioned data string is added with an error correction code by the error correction encoder 11 and outputted via an interface circuit 112 and a terminal 113. Note that the transmission path includes not only an ordinary cable but also transmission via an electric wave and optical transmission.

The data string recorded in the signal recording medium or transmitted via the transmission path is decoded by a decoding apparatus (moving image signal decoding apparatus) identical to a conventional apparatus. In this case, it is possible to obtain a reproduced image better than the case when reproducing a data which has been coded by using a conventional moving image coding apparatus.

As has thus far been described, according to the present invention, when coding a moving image signal by way of motion compensative prediction, a feature amount of the block (macro block) of the input image is used to switch between the motion compensation/non-motion compensation (MC/NonMC) decision methods. Moreover, the prediction residue of the macro block from the motion prediction reference image is compared to a difference in the AC components of the macro block having a motion vector (0, 0) when making the MC/NonMC decision. This enables to effectively use the mode to forcibly convert the motion vector (0, 0) for an image having no motion and affected by a noise, an image in which the luminance value is greatly changed, and a flat dark image having no motion. That is, according to the present invention, even when the motion prediction residue is small on a flat portion of the image, it is possible to prevent generation of a fixed noise as well as to make the motion vector (0, 0) without deteriorating the image quality, thus enabling to significantly enhance the moving image signal coding efficiency and improve the subjective image quality.

What is claimed is:

1. An image signal coding apparatus for dividing an input image signal into a plurality of blocks and using a reference image signal for each of said blocks so as to carry out motion compensative prediction coding, said apparatus comprising:

a division unit for dividing said image signal into a plurality of blocks;

a first calculation unit for calculating a motion vector prediction residue for which a motion compensation is carried out by using said reference image signal for each of said blocks;

a second calculation unit for calculating a residue of a block for which no motion compensation is carried out;

a third calculation unit for calculating an average luminance value of pixel data within each of blocks and a value representing flatness of said block;

a motion compensation/non-motion compensation decision unit for deciding whether to carry out a motion compensative coding according to a comparison result obtained by comparing a magnitude of a motion vector prediction residue of said block to a magnitude of a residue of said block, said motion compensation/non-motion compensation decision unit adaptively switching between decision making region division types to be used in said motion compensation/non-motion compensation decision, according to said average luminance value and said flatness value of said block; and a coding unit for carrying out a motion/compensative prediction coding for each of the blocks according to a result of said decision.

2. An image signal coding apparatus as claimed in claim 1, wherein said second calculation unit calculates as said block residue, a difference in AC components of the block.

3. An image signal coding apparatus as claimed in claim 1, wherein said decision unit, if said average luminance value is smaller than a first threshold value and said flatness value is smaller than a second threshold value, determines to use a decision making region division type having a grater range of non-motion compensation where no motion compensation is carried out.

4. An image signal coding method for dividing an input image signal into a plurality of blocks and using a reference image signal for each of the blocks so as to carry out a motion compensative prediction coding, said method comprising:

a step of dividing said image signal into a plurality of blocks;

a first calculation step for calculating on block basis a motion vector prediction residue of a block for which a motion compensation is carried out by using said reference image signal;

a second calculation step for calculating on block basis a block residue for which no motion compensation is carried out for the block;

a third calculation step for calculating on block basis an average luminance value of pixel data within a block and a flatness value of said block;

a motion compensation/non-motion compensation decision step for determining whether to carry out a motion compensative coding according to a comparison result obtained by comparing on block basis a magnitude of said block motion vector prediction residue to a magnitude of said block residue, said decision step adaptively switching between decision making region division types used in said motion compensation/non-motion compensation decision, according to said average luminance value and said flatness value of the block; and a coding step for carrying out a motion compensative prediction coding for each of the blocks according to said decision made.

5. An image signal coding method as claimed in claim 4, wherein said second calculation step calculates as said block residue, a difference in AC components of the block.

6. An image signal coding method as claimed in claim 4, wherein said decision step, if said average luminance value is smaller than a first threshold value and said flatness value is smaller than a second threshold value, determines to use a decision making region division type having a grater range of non-motion compensation where no motion compensation is carried out.

7. An image signal transmission method for transmitting a coded data obtained by dividing an input image signal into a plurality of blocks and using a reference image signal for each of the blocks so as to carry out a motion compensative prediction coding, said method comprising:

a step of dividing said image signal into a plurality of blocks;

a first calculation step for calculating on block basis a motion vector prediction residue of a block for which a motion compensation is carried out by using said reference image signal;

a second calculation step for calculating on block basis a block residue for which no motion compensation is carried out for the block;

a third calculation step for calculating on block basis an average luminance value of pixel data within a block and a flatness value of said block;

a motion compensation/non-motion compensation decision step for deciding whether to carry out a motion compensative coding according to a comparison result obtained by comparing on block basis a magnitude of said block motion vector prediction residue to a magnitude of said block residue so that a motion vector is generated according to said decision made, said decision being made by adaptively switching between decision making region division types used in said motion compensation/non-motion compensation decision, according to said average luminance value and said flatness value of the block;

a coding step for carrying out a motion compensative prediction coding for each of the blocks according to said decision made; and a transmission step for transmitting said coded data and said motion vector as a coded bit stream.

8. An image signal transmission method as claimed in claim 7, wherein said second calculation step calculates as said block residue, a difference in AC components of the block.

9. An image signal transmission method as claimed in claim 7, wherein said decision step, if said average luminance value is smaller than a first threshold value and said flatness value is smaller than a second threshold value, determines to use a decision making region division type having a grater range of non-motion compensation where no motion compensation is carried out.

10. A recording medium which can be decoded by a decoding apparatus, said recording medium having a coded bit stream containing a coded data and a motion vector obtained by dividing an input image signal into a plurality of blocks, each of which is subjected to a motion compensative prediction coding by using a reference image signal, said coded bit stream being formed by:

- a step of dividing said image signal into a plurality of blocks;
- a first calculation step for calculating on block basis a motion vector prediction residue of a block for which a motion compensation is carried out by using said reference image signal;
- a second calculation step for calculating on block basis a block residue for which no motion compensation is carried out for the block;
- a third calculation step for calculating on block basis an average luminance value of pixel data within a block and a flatness value of said block;
- a motion compensation/non-motion compensation decision step for deciding whether to carry out a motion compensative coding according to a comparison result obtained by comparing on block basis a magnitude of said block motion vector prediction residue to a magnitude of said block residue so that a motion vector is generated according to said decision made, said decision being made by adaptively switching between decision making region division types used in said motion compensation/non-motion compensation decision, according to said average luminance value and said flatness value of the block;
- a coding step for carrying out a motion compensative prediction coding for each of the blocks according to said decision made; and
- a transmission step for transmitting said coded data and said motion vector as a coded bit stream.

11. A recording medium as claimed in claim 10, wherein said second calculation step calculates as said block residue, a difference in AC components of the block.

12. A recording medium as claimed in claim 10, wherein said decision step, if said average luminance value is smaller than a first threshold value and said flatness value is smaller than a second threshold value, determines to use a decision making region division type having a grater range of non-motion compensation where no motion compensation is carried out.

13. A coded stream containing a coded data and a motion vector obtained by dividing an input image signal into a plurality of blocks, each of which is subjected to a motion compensative prediction coding by using a reference image signal, said coded stream being generated by:

- a step of dividing said image signal into a plurality of blocks;
- a first calculation step for calculating on block basis a motion vector prediction residue of a block for which a motion compensation is carried out by using said reference image signal;
- a second calculation step for calculating on block basis a block residue for which no motion compensation is carried out for the block;
- a third calculation step for calculating on block basis an average luminance value of pixel data within a block and a flatness value of said block;
- a motion compensation/non-motion compensation decision step for deciding whether to carry out a motion compensative coding according to a comparison result obtained by comparing on block basis a magnitude of said block motion vector prediction residue to a magnitude of said block residue so that a motion vector is generated according to said decision made, said decision being made by adaptively switching between decision making region division types used in said motion compensation/non-motion compensation decision, according to said average luminance value and said flatness value of the block;
- a coding step for carrying out a motion compensative prediction coding for each of the blocks according to said decision made; and
- a transmission step for transmitting said coded data and said motion vector as a coded bit stream.

14. A coded stream as claimed in claim 13, wherein said second calculation step calculates as said block residue, a difference in AC components of the block.

15. A coded stream as claimed in claim 13, wherein said decision step, if said average luminance value is smaller than a first threshold value and said flatness value is smaller than a second threshold value, determines to use a decision making region division type having a grater range of non-motion compensation where no motion compensation is carried out.

* * * * *